Feb. 26, 1963    J. O. MELTON ETAL    3,079,183
BALL JOINT ASSEMBLY
Filed Dec. 19, 1960

INVENTORS
JAMES O. MELTON &
THOMAS B. WILKINSON
BY

Jerry J Dunlap
ATTORNEY 3,079,183
BALL JOINT ASSEMBLY
James O. Melton, 1208 Cruce St., Norman, Okla., and Thomas B. Wilkinson, 5925 S. Eggleston, Oklahoma City, Okla.
Filed Dec. 19, 1960, Ser. No. 76,600
3 Claims. (Cl. 287—90)

This invention relates to ball joint bearing assemblies, and more particularly, but not by way of limitation, to ball joint assemblies as applied to front end suspension systems of automobiles. In the manufacture of automobiles today, ball joint type bearings are widely used in the steering mechanisms and suspension systems of the front wheels in order to promote the ease with which the automobile may be steered and also to improve the riding quality of the automobile. For example, a ball joint type bearing is used in the pivotal coupling between the steering control arm and the steering knuckles of the automobile.

In the previously existing types of ball joints, the mating surfaces of the spherical member, or ball, and the socket member in which the ball is located become worn over extended periods of use so that rattles are developed in the assembly. Such wearing of the mating surfaces also produces play in the assembly between the ball member and its enclosing socket so that the driver of the automobile has less control over its steerage than is desirable. Previously, attempts have been made to overcome such play and rattles by inserting some type of resilient member in the assembly for the purpose of constantly urging the ball member against one side of the socket member. Although this arrangement has tended to reduce the play and rattle which developed in the ball joint assembly over extended periods of use, it has also had the detrimental effect of increasing the frictional resistance to turning. Moreover, the use of such a resilient member has not been effective to prevent the occurrence of further wear which is caused by the entrance of foreign matter into the socket member, such as the ingress of muddy water and dust which are encountered by the ball joint assemblies utilized in an automobile steering mechanism.

The present invention contemplates a novel ball joint assembly utilizing a helical spring around the stud which extends from the ball member to constantly urge the ball member into contact with the socket member and thereby to reduce play and rattles. The ball joint assembly further includes a novel bearing means which is disposed between the helical spring and the outer surface of the spherically shaped socket member and which serves to minimize the friction created by the force of the spring in the assembly and also to prevent the ingress of deleterious material to the inside of the socket. The novel bearing means to which we refer comprises a metallic washer which is recessed at one of its sides for receiving and seating one end of the helical spring, a cup-shaped thrust washer of high density synthetic resin which is pressed into a recess on the opposite side of the metallic washer, and a frusto-spherically shaped bearing washer which is also constructed of a high density synthetic resin and which cooperates with the outer periphery of the socket member, and with the cup-shaped thrust washer to reduce friction in the assembly. The metallic washer and its cup-shaped thrust washer insert are provided with apertures which are of a size to fit closely around the stud which extends from the ball member, and thus provide an effective seal of the socket member from the entrance of deleterious matter, such as dirt, mud, water, etc. In a preferred embodiment of the invention, the cup-shaped thrust washer which is pressed into the metallic washer is constructed of a high density synthetic resinous material which has a different molecular structure than the resinous material from which the frusto-spherical bearing washer is constructed. We have found that the utilization of resins of different molecular structure in these two elements prevents the occurrence of interpolymerization between the molecules of the two elements which tends to occur between resins of identical molecular structure, and thus prevents any tendency of the resinous washers to stick or bind.

It is an object of this invention to provide a ball joint assembly which will improve the steering performance of automobiles.

Another object of this invention is to provide a ball joint assembly in which the ball is maintained in contact with its socket member at all times during the life of the assembly by virtue of the constantly applied bias of a compression spring member.

A further object of the invention is to provide a ball joint assembly which will maintain the ball in the ball joint body under constant tension, thus assuring a bearing which is characterized by reduced slack and play, and yet to provide a bearing which may be easily turned.

An additional object of the present invention is to provide a ball joint assembly which will prevent the ingress of water, mud, dirt and other deleterious materials to the bearing surfaces.

A further object of the present invention is to provide a ball joint assembly which will not require adjustment after it has been installed on the automobile.

An additional object of the present invention is to provide a ball joint assembly which is simple and economical to produce and which is characterized by a long and trouble-free service life.

These objects and advantages, and other additional objects and advantages will become apparent and be better understood by referring to the following description in conjunction with the attached drawings which illustrate our invention.

Figure 1:
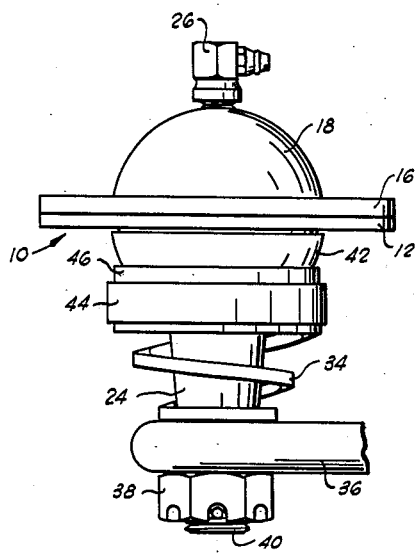
FIGURE 1 is a side elevation of a ball joint assembly constructed according to this invention.
Figure 3:
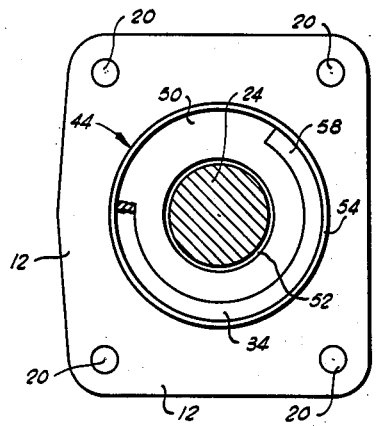
FIGURE 3 is a sectional view taken along lines 3—3 of FIG. 2.

Referring now to the drawings in detail, and particularly to FIG. 1, reference character 10 generally designates a socket member which is comprised of a lower plate 12 having a hemispherical shaped socket portion 14 and an upper plate 16 which is secured over the lower plate 12 and which is provided with a hemispherical shaped socket portion 18 in registry with the socket portion 14 of the lower plate 12. Bolt holes 20 are provided through the upper and lower plates 16 and 12, respectively, to facilitate the mounting of the assembly to an automobile (not shown). An opening 22 is provided in the center of the socket portion 14 to pass a cylindrical stud 24 and is of a size to allow the stud to be pivoted with respect to the socket member 10 during operation of the ball joint assembly. A grease fitting 26 is located in the center of the hemispherically shaped socket portion 18 of the upper plate 16 to facilitate the lubrication of the ball joint.

The end 28 of the stud 24 which projects upwardly into the socket member 10 is rigidly secured to a ball member 30 in any suitable manner, such as by tightly threading the end 28 into a threaded bore formed in the ball member 30. It will be understood that the socket formed by the cooperating upper and lower plates 16 and 12, respectively, is of a size to provide a tight sliding fit of the ball member 30 therein when the assembly is new. However, after a relatively short operating period, the cooperating surfaces of the ball member 30 and the socket member 10 will become worn so that the ball member 30 fits rather loosely in the socket member and a certain amount of play with attendant rattling will tend to develop.

In order to reduce or eliminate the looseness and play which eventually develops between the ball member 30 and its enclosing socket member 10, a conically shaped helical compression spring 34 is interposed between the socket member 10 and the portion of the automobile steering mechanism to which the ball joint assembly is connected. Typically, this may be a steering knuckle 36 of the type illustrated in the accompanying drawings. One method of securing the stud 24 to the steering knuckle 36 is by the use of a nut 38 which engages threads on the outer end 40 of the stud. By positioning the helical compression spring 34 between the steering knuckle 36 and the hemispherical shaped socket portion 14 of the lower plate 12, the ball member 30 is constantly urged into contact with the inner surface of the hemispherically shaped socket portion 14.

Although the use of the helical compression spring 34 greatly aids in the reduction of looseness or play occurring in the ball joint, the utilization of such a spring in contact with the hemispherically shaped socket portion 14 amplifies the frictional resistance to pivotation of the ball member 30 in its socket and makes turning of the automobile considerably more difficult than is the case in a newly assembled ball joint not using such a spring where contact of the ball member 30 with the socket member 10 provides the only frictional resistance to turning. Moreover, the helical compression spring 34 does not provide any effective seal against the infiltration of mud, water and dirt into the socket member 10 during operation of the automobile. Finally, the bias of the spring 34 is not distributed evenly to the outer periphery of the hemispherical shaped socket portion 14 during all operating conditions to which the ball joint may be subjected. Thus, when the ball member 30 and its associated stud 24 are pivoted to an extreme position with respect to the socket member 10, a greater force is likely to be imposed upon the hemispherically shaped socket portion 14 by one side of the compression spring 34 than is imposed by the opposite side of the spring.

In order to vastly improve the performance of a ball joint assembly of the type described while retaining the benefit derived from the utilization of the helical compression spring 34, we have devised a novel bearing means which is interposed between the helical compression spring 34 and the outer periphery of the hemispherically shaped socket portion 14. The bearing means comprises a frusto-spherically shaped bearing washer 42 which is constructed of a high density synthetic resin, a metallic washer 44 and a cup-shaped thrust washer 46 which is interposed between the metallic washer 44 and the frusto-spherically shaped bearing washer 42, and which, like the bearing washer 44, is also constructed of a high density synthetic resin material. The three washers, 42, 44 and 46, are each characterized by a central aperture and concentrically surround the stud 24 between the steering knuckle 36 and the outer periphery of the hemispherically shaped socket portion 14.

Figure 2:
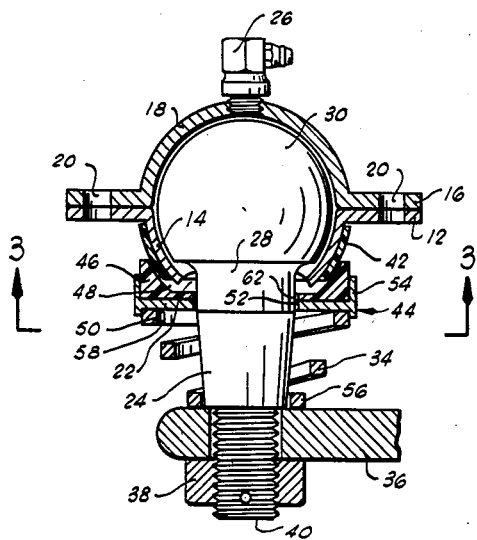
FIGURE 2 is a vertical cross-sectional view of the structure shown in FIG. 1.

With respect to the frusto-spherically shaped bearing washer 42, this element of the ball joint assembly is of a shape to mate with the outer periphery of the hemispherical shaped socket portion 14 and is provided with an aperture 48 therethrough which is considerably larger in diameter than the diameter of the stud 24. It will also be noted in referring to FIG. 2 that the frusto-spherically shaped bearing washer 42 is considerably thinner than the cup-shaped thrust washer 46. Since the frusto-spherically shaped bearing washer 42 is shaped to substantially conform to the outer surface of the hemispherical shaped socket portion 14, a large area of contact will be continuously maintained between the bearing washer 42 and the socket member 10 as the stud 24 pivots with respect to the socket member.

Figure 4:
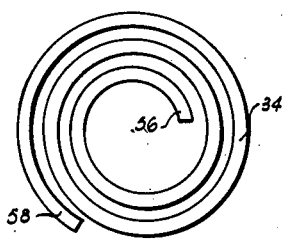
FIGURE 4 is an end view of the helical compression spring utilized in the invention.

The metallic washer 44 comprises a disc-shaped portion 50 having an axial opening 52 therethrough of a size to receive the stud 24 with only a slight clearance around the stud, and further having an axially extending, annular flange 54 around its outer periphery. The annular flange 54 extends in an axial direction from both sides of the disc-shaped portion 50 so that the metallic washer 44 may be described as being recessed at its upper and lower surfaces. The flange 54 thus forms a guide or retainer for the upper end of the helical compression spring 34 and also forms a seat for the cup-shaped thrust washer 46. In the preferred embodiment of the present invention illustrated in FIGS. 1, 2 and 4, the spring 34 is constructed of a relatively flat and wide spring material so that relatively large, flat contact areas 56 and 58 engage the steering knuckle 36 and the metallic washer 44, respectively, thereby eliminating the necessity of a supporting washer between elements. It will also be noted in referring to FIGS. 2 and 4 that the helical compression spring 34 is of smaller diameter at its end which is in contact with the steering knuckle 36 than at its end which is in contact with the metallic washer 44. This construction promotes a more even distribution of the compressive force which is constantly exerted by the spring upon the metallic washer 44 and, also, the use of a frusto-conical spring configuration introduces a non-linear spring constant into the functioning of the spring so that its resistance to compression increases as the metallic washer moves downwardly toward the steering knuckle 36.

The cup-shaped thrust washer 46 which is pressed into the recess formed in the upper surface of the metallic washer 44 is generally cylindrical in its outer peripheral configuration with a frusto-spherical recess formed in its upper surface. The radius of curvature of the inner walls of the thrust washer 46 is substantially identical to the radius of curvature of the frusto-spherically shaped bearing washer 42 so that the thrust washer 46 is in flatly abutting contact with the bearing washer 42 over a relatively large surface area when the ball joint is assembled. The thrust washer 46 is provided with an axial opening 62 therethrough of a size to receive the stud 24 with only a slight clearance around the stud. As has previously been mentioned, the outside diameter of the thrust washer 46 is slightly larger than the diameter of the annular flange 54 of the metallic washer 44 so that the thrust washer 46 may be pressed into the metallic washer 44 and frictionally retained therein during operation of the ball joint.

In operation of the ball joint assembly of the present invention, the steering knuckle 36 pivots with respect to the socket member 10 and also moves angularly with respect to the socket member. Both of these motions of the steering knuckle 36 cause the ball member 30 to turn within the confines of its socket member 10. As the stud 24 pivots with respect to the socket member 10, the thrust washer 46 and its associated metallic washer 44 are constrained to move with the stud 24 by virtue of the close fit which these members form with the stud and also by reason of the frictional contact between the compression spring 34 and both the metallic washer 44 and the steering knuckle 36. The frusto-spherically shaped bearing washer 42, on the other hand, tends to remain fixed with respect to the hemispherical shaped socket portion 14 of the lower plate 12 by virtue of its large surface area of contact. The bearing washer 42 is also prevented from turning by virtue of the location of its upper edge in juxtaposition to the planar surface of the lower plate 12. The minimum resistance to movement of the stud 24 with respect to the socket member 10 is offered by the contacting surfaces of the thrust washer 46 and the frusto-spherically shaped bearing washer 42. As has been previously indicated, both of the latter elements are constructed of a high density synthetic resin, and it is now to be further noted that these resins are of the type which are characterized by relatively low coefficients of friction and may thus be described as having inherently lubricous surfaces. Some of the synthetic resin materials which have proven satisfactory for use in the construction of the thrust washer 46 and the bearing washer 42 include: polymerized olefin, such as that sold under the trade name "Marlex"; polymerized tetrafluoroethylene, such as is sold under the trade name "Teflon"; and long chain synthetic polymerized amides, such as are sold under the trade name "Nylon."

We have further found that it is preferable to construct the bearing washer 42 from a synthetic resinous material of differing molecular structure from the material of construction of the thrust washer 46. It appears that there exists a tendency of the molecules of the thrust washer 46 to polymerize with the molecules of the bearing washer 42 when identical materials are utilized in the construction of the two elements. This interpolymerization between the two elements results in the occurrence of some sticking or binding which renders the bearing formed between the two elements less effective. It should be noted, however, that the same types of plastic or resinous materials may be utilized provided the chain length of the molecules in the bearing washer 42 differs from the chain length of the molecules in the thrust washer 46. Such difference in molecular chain length also tends to suppress the tendency of the molecules in the adjacent surfaces of the two elements to interpolymerize, resulting in the detrimental effect described. Although, as we have indicated, other constructions may be utilized, we prefer to construct the cup-shaped thrust washer 46 of polyethylene and the frusto-spherically shaped bearing washer 42 of nylon. It is believed that the greatest strength and lowest frictional resistance to turning for an economically feasible construction may be realized with the latter materials.

For illustrative purposes, this invention has been described as it particularly relates to automobile steering mechanism assemblies. It is, however, apparent that the principles of the invention may be adapted to any ball joint type bearing mechanism which is utilized to connect two relatively movable members, whether used in automobile assemblies or otherwise.

It will be manifest to those skilled in the art that certain details of construction may be modified or altered to meet certain existing operating conditions or needs without departing from the spirit and scope of the invention as defined in the appended claims.

We claim:

1. A ball joint assembly for pivotally interconnecting two members, comprising
   a body having a socket portion and adapted for connection with one of said members, said socket portion having an opening therein;
   a ball member in said socket;
   a stud of smaller diameter than said opening secured to said ball member and extending through said opening for connection to the other of said pivotally interconnected members;
   a first high density resin washer of a configuration complementary to said socket around said stud in juxtaposition to the outer periphery of said socket;
   a metallic washer around said stud, said metallic washer having recesses in both its opposed planar surfaces;
   a second high density resin washer around said stud frictionally retained in the recess in said metallic washer adjacent said first resin washer and bearing against said first resin washer; and
   a helical compression spring positioned between the other of said pivotally interconnected members and said metallic washer, and having one of its ends frictionally retained in the recess in said washer opposite the recess frictionally retaining said second high density resin washer whereby the relative position of said spring to said metallic washer may be constantly maintained.

2. A ball joint assembly for pivotally interconnecting two members, comprising
   a body having a socket portion and adapted for connection with one of such members, said socket portion having an opening therein;
   a ball member in said socket;
   a stud of smaller diameter than said opening secured to said ball member and extending through said opening for connection to the other of said pivotally interconnected members;
   a first high density resin washer of a configuration complementary to said socket around said stud in juxtaposition to the outer periphery of said socket;
   a metallic washer which is recessed at both its opposed planar surfaces around said stud;
   a second high density washer constructed of a different high density resinous material from said first high density resin washer and positioned around said stud and frictionally retained in one of the recesses in said metallic washer and bearing against said first resin washer; and
   a helical compression spring around said stud compressively retained between said other of said pivotally interconnected members and said metallic washer, said spring having a diminishing cross-sectional diameter from its end in contact with said metallic washer to its end in contact with said other member, and said spring being received at its end in contact with said metallic washer by the other of the recesses in said metallic washer.

3. A ball joint assembly for pivotally interconnecting two members, comprising:
   a body having a socket portion and adapted for connection with one of said members, said socket portion having an opening therein;
   a ball member in said socket;
   a stud of smaller diameter than said opening secured to said ball member and extending through said opening for connection to the other of said pivotally interconnected members;
   a first high density resin washer of a configuration complementary to said socket around said stud in juxtaposition to the outer periphery of said socket;
   a metallic washer around said stud, said metallic washer having recesses in both its opposed planar surfaces;
   a second high density resin washer around said stud frictionally retained in the recess in said metallic washer adjacent said first resin washer and bearing against said first resin washer; and
   resilient means having a first end and a second end and positioned between the other of said pivotally interconnected members and said metallic washer, said resilient means having its first end frictionally retained in the recess in said washer opposite the recess frictionally retaining said second high density resin washer whereby the position of said resilient means relative to said metallic washer may be constantly maintained.

References Cited in the file of this patent

UNITED STATES PATENTS

| | | |
|---|---|---|
| 2,122,655 | Niles | July 5, 1938 |
| 2,912,267 | Latzen | Nov. 10, 1959 |
| 2,957,713 | Herbenar | Oct. 25, 1960 |
| 3,010,746 | Melton et al. | Nov. 28, 1961 |